United States Patent [19]

Rossbach

[11] Patent Number: 5,272,660
[45] Date of Patent: Dec. 21, 1993

[54] METHOD AND APPARATUS FOR PERFORMING INTEGER AND FLOATING POINT DIVISION USING A SINGLE SRT DIVIDER IN A DATA PROCESSOR

[75] Inventor: Paul C. Rossbach, Austin, Tex.

[73] Assignee: Motorola, Inc., Schaumburg, Ill.

[21] Appl. No.: 891,095

[22] Filed: Jun. 1, 1992

[51] Int. Cl.⁵ .................................................. G06F 7/38
[52] U.S. Cl. ...................................... 364/748; 364/761
[58] Field of Search ............... 364/748, 761, 764, 766, 364/767

[56] References Cited

U.S. PATENT DOCUMENTS

| | | | |
|---|---|---|---|
| 4,405,992 | 9/1983 | Blau et al. | 364/748 |
| 4,413,326 | 11/1983 | Wilson et al. | 364/748 |
| 4,477,879 | 10/1984 | Wong | 364/748 X |
| 4,484,259 | 11/1984 | Palmer et al. | 364/748 X |
| 4,760,550 | 7/1988 | Katzman et al. | 364/748 |
| 4,878,190 | 10/1989 | Darley et al. | 364/761 X |
| 4,901,267 | 2/1990 | Birman et al. | 364/748 X |
| 4,949,295 | 8/1990 | Stearns | 364/748 |
| 4,979,142 | 12/1990 | Allen et al. | 364/767 |
| 4,996,660 | 2/1991 | Beacom et al. | 364/748 |
| 4,999,801 | 3/1991 | Katsuno | 364/748 |

Primary Examiner—Tan V. Mai
Attorney, Agent, or Firm—Charlotte B. Whitaker

[57] ABSTRACT

A method and apparatus for performing integer and floating-point divide operations using a single modified SRT divider in a data processor. The floating-point and integer division is performed using SRT division on normalized positive mantissas (dividend and divisor). Integer division shares portions of the floating point circuitry, however, the sequence of operations is modified during the performance of an integer divide operation. The SRT divider performs a sequence of operations before and after an iteration loop to re-configure an integer divisor and dividend into a data path representation which the SRT algorithm requires for floating-point mantissas. During the iteration loop, quotient bits are selected and used to generate intermediate partial remainders. The quotient bits are also input to quotient registers which accumulate the final quotient mantissa. A full mantissa adder is used to generate a final remainder.

16 Claims, 10 Drawing Sheets

METHOD AND APPARATUS FOR PERFORMING INTEGER AND FLOATING POINT DIVISION USING A SINGLE SRT DIVIDER IN A DATA PROCESSOR

FIELD OF THE INVENTION

This invention relates generally to data processing systems, and more particularly to data processing systems which perform SRT division.

CROSS REFERENCE TO RELATED APPLICATION

This application is related to an application entitled "In a Data Processor An SRT Divider Having a Negative Divisor Sticky Detection Circuit", Ser. No. 07/891,094, U.S. Pat. No. 5,237,525, filed herewith and assigned to the assignee hereof.

BACKGROUND OF THE INVENTION

There is an increasing trend to integrate more floating-point hardware on the main data processor chip. While on-chip integration of floating-point hardware is desirable, limitations of available chip area on high-performance data processors present implementation obstacles. Although integer and floating point division occur infrequently in data processors, divide operations are difficult to pipeline and typically have long latencies. Consequently, in many data processors a significant performance degradation occurs as a result of such data processor performing a divide operation. Furthermore, most data processing systems employ co-processors to perform faster floating-point division, while the main data processor performs the integer divide operations. Thus, today's data processors are generally characterized by slow divide performance, and specifically by slow integer divide performance. This phenomenon is attributable to the fact that faster floating-point divide performance exists primarily in co-processors, but not on single-chip data processors, and not for integer divides.

SUMMARY OF THE INVENTION

In a data processor having an iterative divider unit for executing a plurality of divide instruction, issued by a sequencer, and a storage unit for storing a plurality of data operands, a method and apparatus for performing integer and floating point SRT division in the divider unit is provided. A set of multiplexors align a divisor value and a dividend value retrieved from the storage unit, into a predetermined data format based upon a type of divide operation to be performed by the divider unit. A full adder computes a two's complement of the divisor value, when the divider unit is performing an integer divide operation. The priority encoder and barrel shifter in the divider unit normalize the two's complemented divisor value to create a floated integer divisor. Quotient select circuitry generates a first set of quotient bits and generates a plurality of successive sets of quotient bits each iteration cycle, during an iteration loop. During each iteration cycle, partial remainder formation logic uses the successive sets of quotient bits and the floated integer divisor to form a plurality of intermediate redundant partial remainders. The sets of quotient bits are accumulated in a set of registers and used to form a quotient (Q) value and a quotient value minus one (Q−1). A set of multiplexors normalize the Q and Q−1 values into a predetermined data format to form normalized Q and Q−1 quotient values. Based upon the sign (positive or negative) of the final partial remainder, the normalized Q or Q−1 quotient value is selected to be a quotient result. If the divider operation is an integer divide, the adder computes the two's complement of the quotient result to create an integer divide quotient. The integer divide quotient is re-aligned into an internal format for storage in said storage unit, and transferred back to the storage unit.

DETAILED DESCRIPTION OF A PREFERRED EMBODIMENT

The terms "assert" and "assertion" are used when referring to the rendering of a signal or similar apparatus into its logically true (active) state, whereas, "negate" and "negation" are used when the signal or other apparatus is rendered into its logically false (inactive) state. The asterisk symbol will be used to indicate a complemented signal. For example, BUS REQUEST* indicates a signal that is the complementary logic state of the BUS REQUEST signal.

Figure 1:
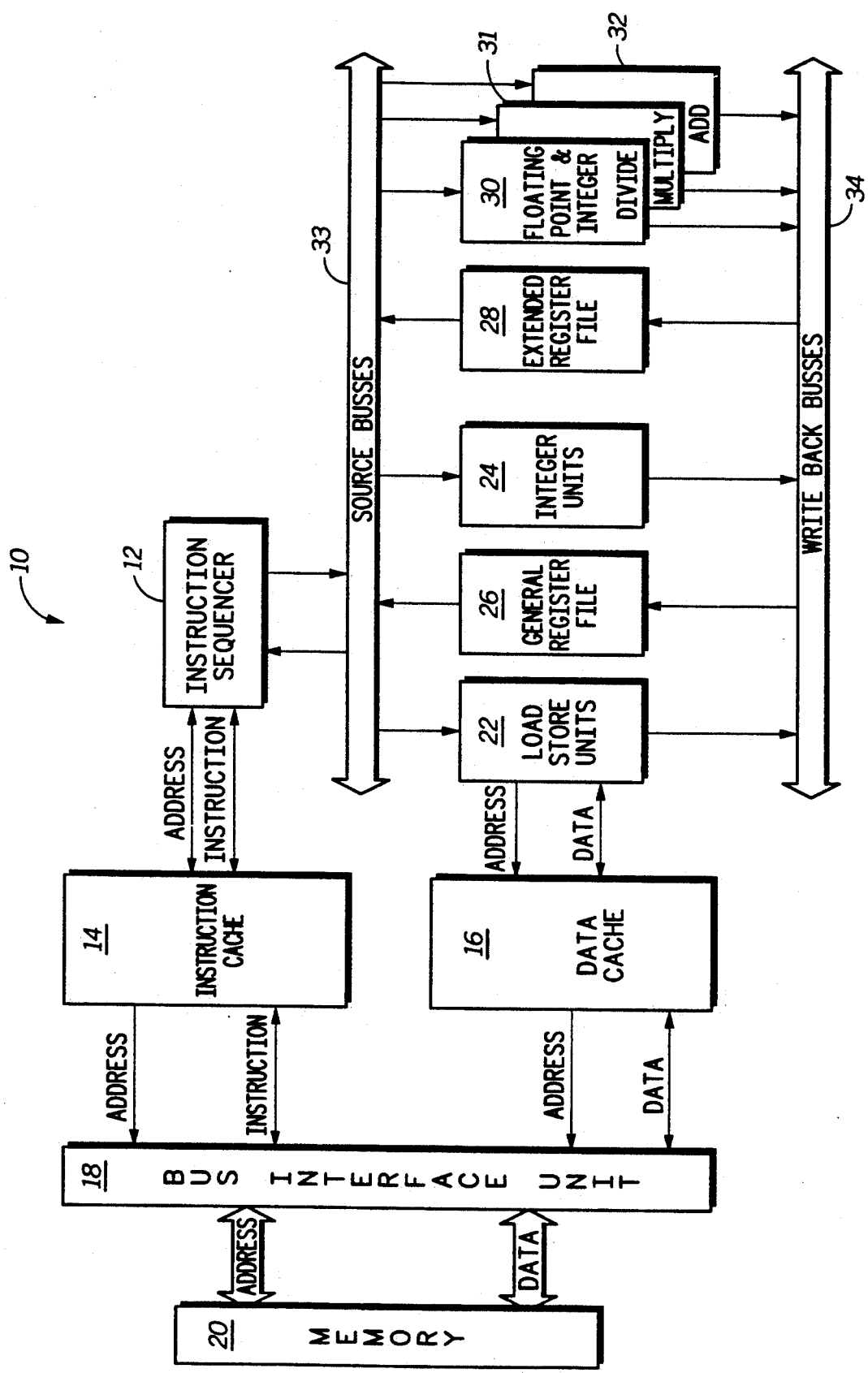
FIG. 1 illustrates, in block diagram form, a data processing system having a combination floating point and integer SRT divider in accordance with a preferred embodiment of the invention.

Illustrated in FIG. 1 is a block diagram of an integrated circuit data processing system 10 for implementing the present invention. In a preferred embodiment, data processing system 10 includes an instruction sequencer 12, an instruction cache 14, a data cache 16, a bus interface unit 18, an external memory 20, load/store units 22, integer execution units 24, register files 26 and 28, and floating point and integer units 30-32. The instruction sequencer 12 provides control over the data flow between execution units 22, 24, 30-32, and the register files 26 and 28. Accordingly, the instruction sequencer 12 implements a 4-stage (fetch-decode-execute-writeback) master instruction pipeline, enforces data interlocks, dispatches (issues) instructions to available execution units 22, 24, and 30-32, directs data from the register files 26 and 28 onto and off of the busses 33 and 34.

In accordance with the preferred embodiment, a large 32-word general purpose register file (GRF) 26 provides operands for integer, logical, bit-field, memory addressing, and floating point operations. In addition, an extended 32-entry register file (XRF) 28 provides additional storage for floating point operands. The XRF 28 can hold thirty-two values of any precision (single, double, or extended). There are two writeback busses 34 available to the execution units 22, 24, and 30-32. For the purpose of simplification, the term "write-back" will be used when a particular execution unit transfers information onto one of the two buses comprising the writeback busses 34. Execution units 22, 24, and 30-32 are each independent functional units with their own internally controlled pipelines. When an execution unit finishes execution of an instruction it places the result data onto a writeback bus 34. The register files 26 and 28 take the data off the writeback busses 34 and store it into the correct destination register. If another instruction is waiting for this data, it is "forwarded" past the register files 26 and 28 directly into the appropriate function unit(s). This allows a data dependent instruction to issue on the next clock without waiting for the data to be written into the register file and read out back again. Since different execution units have different pipeline lengths, it is possible for more than two instructions to be completing in a given clock cycle. Consequently, execution units 22, 24, and 30-32 arbitrate for an available slot on a writeback bus 34. The highest writeback priority is granted to single cycle execution units, such as the integer units 24, so that single cycle instructions are always guaranteed a writeback slot while multistage pipeline units, such as floating point units 30-32 and load/store units 22, arbitrate for writeback slots. Pipelined execution units which are denied a writeback slot, will continue to advance their internal pipeline stages and accept new instructions until all pipeline stages are full.

In the preferred embodiment, the floating point and integer units 30-32 run concurrently with all other execution units 22 and 24 and any mix of integer, memory, and floating point operations can be issued together in the same clock. The floating point adder (ADD) 31 and multiplier (MULTIPLY) 32 units execute floating point instructions in three clocks (independent of the operand precision) but are fully pipelined to allow new instructions to issue every clock. In accordance with the present invention, the divider unit (DIV) 30 is a non-pipelined iterative combination floating point and integer SRT divider. Accordingly, the divider unit 30 is shared between floating point and integer divide operations. The results produced by the floating point units 30-32 are exact IEEE results with no software fix-up required.

Figure 2:
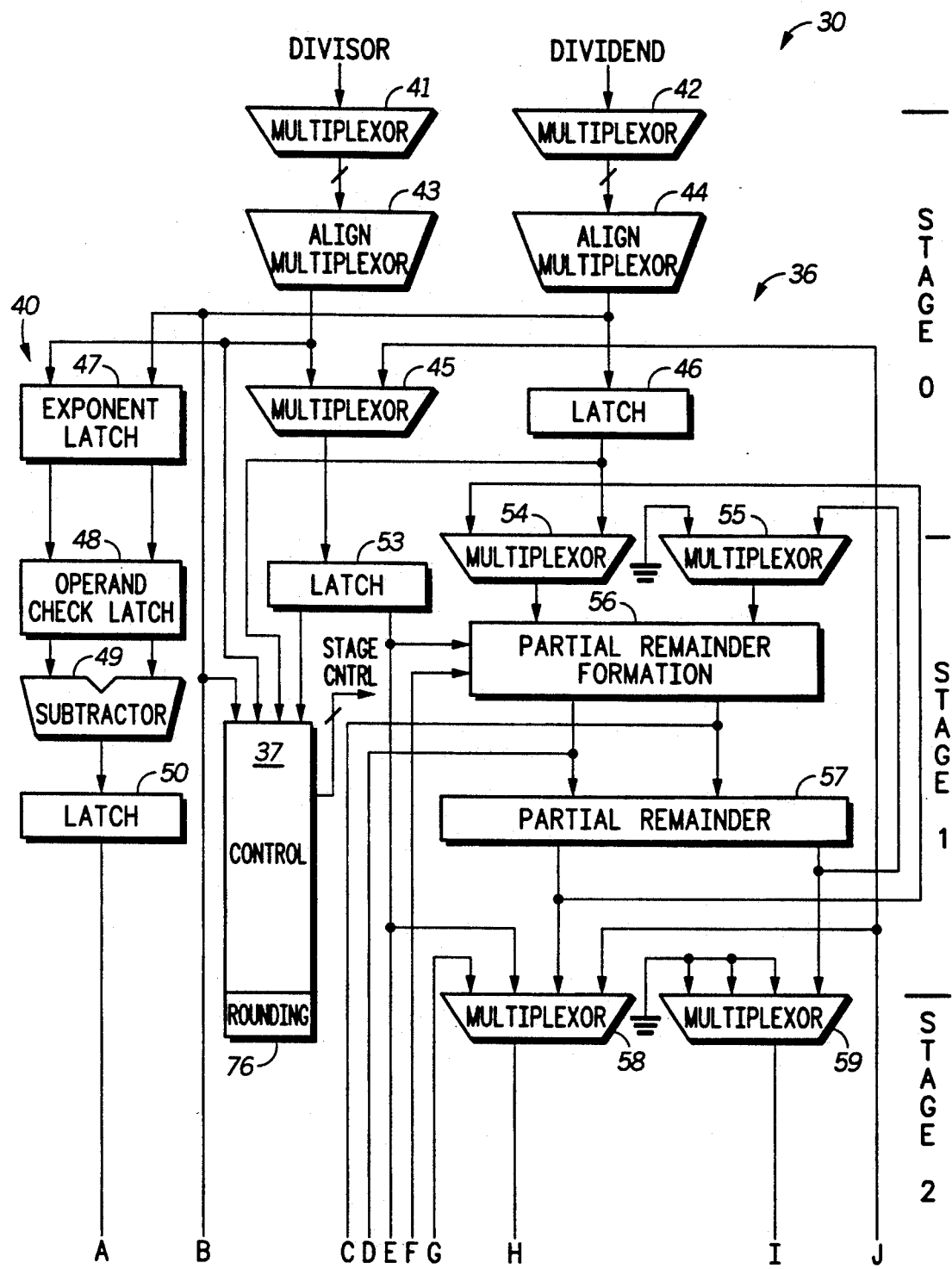
FIG. 2 illustrates, in block diagram form, a first portion of a multi-stage combination floating point and integer SRT divider, in accordance with the preferred embodiment of the invention.
Figure 3:
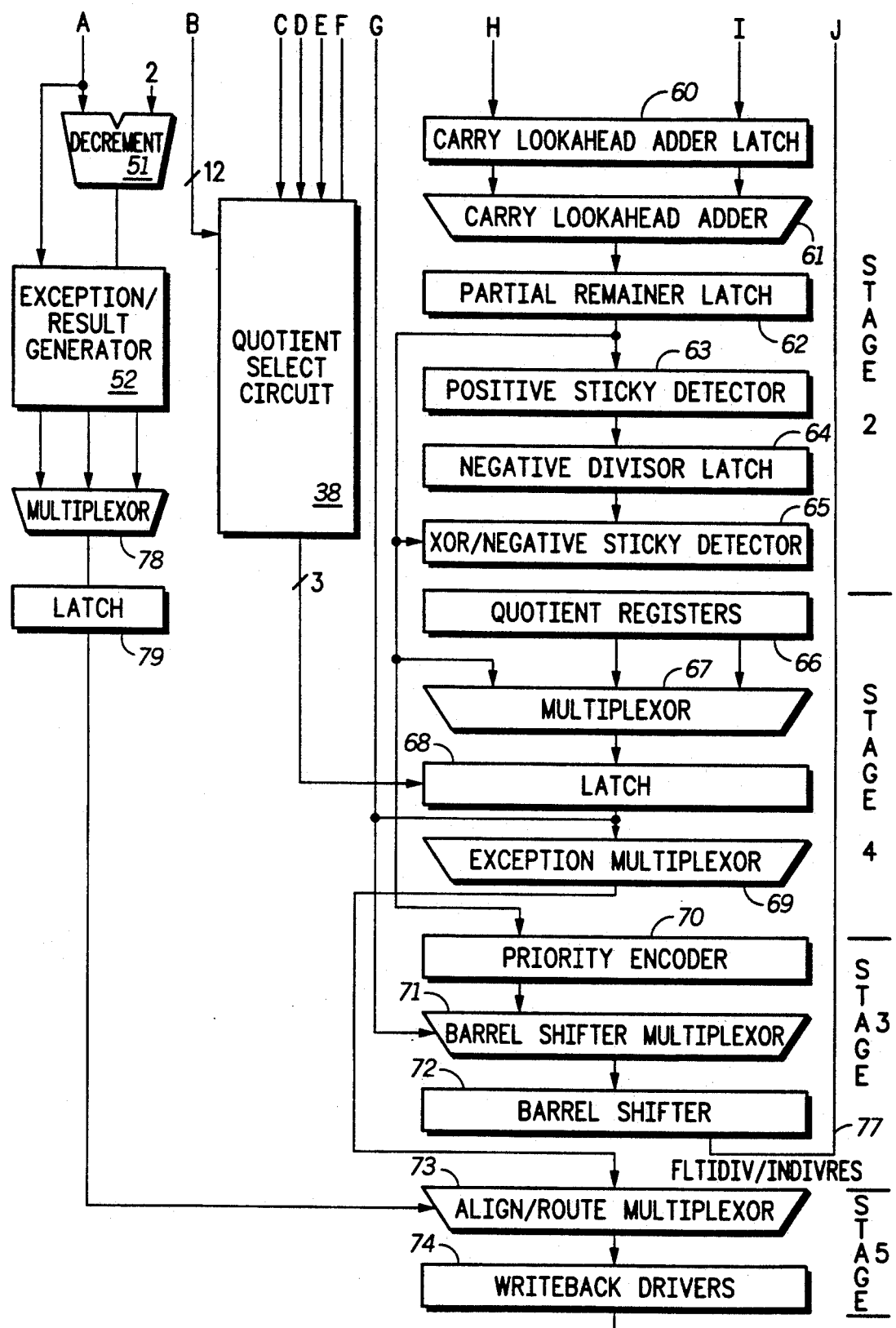
FIG. 3 illustrates, in block diagram form, a second portion of the multi-stage combination floating point and integer SRT divider, in accordance with the preferred embodiment of the invention.
Figure 4:
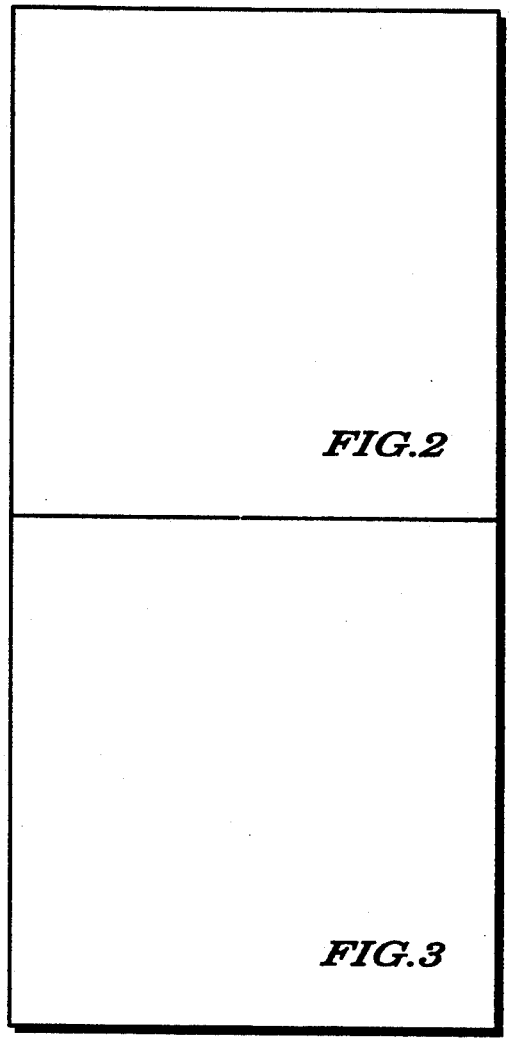
FIG. 4 illustrates the proper orientation of FIGS. 2 and 3.

Illustrated in FIGS. 2 and 3 is a block diagram of the divider unit 30, in accordance with a preferred embodiment of the present invention. The divider unit 30 includes a divider mantissa data path portion 36, divider control logic 37, quotient select circuitry 38, and a exponent pipeline 40. In the present invention, divider 30 performs floating-point and integer divide operations using SRT division. The basis of radix-N SRT division is to chose log2(N) quotient bits each cycle by examining an approximation of the current partial remainder and (potentially) the divisor. Radix-2 SRT division has the simplest and fastest quotient selection hardware (since only the top four bits of the redundant partial remainder must be examined); however, radix-2 SRT division has the disadvantage of only selecting one quotient bit at a time. The present invention uses overlapped stages of radix-2 quotient selection logic to obtain three quotient bits (q0, q1 and q2) per iteration while taking advantage of the speed of the radix-2 quotient selection hardware. Thus, the divider unit 30 uses three radix-2 SRT non-restoring stages to produce three quotient bits per cycle (radix-8).

During a divide operation, a choice of quotient digits, starting with the most significant and progressing to the least significant digits, are computed. Accordingly, as part of each iteration, a quotient digit decision is made which requires that the partial remainder be recomputed based on the last partial remainder and quotient digit. Thus, the quotient is accumulated from equation (eq.) 1.1:

$$Q = \sum_{i=0}^{n-1} q_i r^{-i}, \qquad \text{Eq.(1.1)}$$

where r is the radix, n is the number of quotient digits calculated and Q is the accumulated quotient result with a precision of $r^{-(n-1)}$, and $q_i$ is the quotient digit determined from the stage i. In SRT division, the quotient digit selected at each stage in the division determines the operation computing the next partial remainder according to equation 1.2:

$$PR_{i+1} = rR_i - Dq_i, \qquad \text{Eq. (1.2)}$$

where $PR_i$ is the partial remainder output of stage i, and D is the Divisor, and where the divide sequence is initialized using equation 1.3:

$$rR_0 = \text{the Dividend.} \qquad \text{Eq. (1.3)}$$

In the preferred embodiment, the divider mantissa portion 36 comprises six stages 100-105. Floating-point division is performed using SRT division on normalized positive mantissas (dividend and divisor). The exponent subtraction is performed in the exponent pipe 40 where floating-point overflow and underflow is also handled. The quotient select logic 38 produces three quotient bits ($q_0$, $q_1$, and $q_2$) per iteration (clock cycle), and the partial remainder formation circuit 56 consumes these three bits on the following clock cycle. Accordingly, the quotient selection logic 38 selects the next quotient bits based on the current partial remainder, while the partial remainder formation circuitry 56 uses the next quotient bits to generate the next partial remainder in a redundant carry-save form. The quotient bits are also input to the quotient registers 66 in the mantissa path 36 to form the final quotient mantissa. A full mantissa adder 61 is used to generate an irredundant ("real") final remainder (RPR) from the last pair of carry and save partial remainder vectors which comprise a redundant partial remainder (RDPR). In a conventional manner, the final remainder is used by the rounding circuitry 76 (under the control of the control logic 37) for proper rounding of the floating-point result. The control 37 sequences the control (CNTRL) signals needed to perform the floating point division.

The SRT algorithm for floating-point mantissas requires the following data path representation Format 1 for the dividend and divisor:

Format 1:  0   0   H   .   $M_{62}$ $M_{61}$ $M_{60}$ .... $M_1$ $M_0$
           (zeros) (1) (.) (mantissa bits up to 63 for extended precision), where H denotes a hidden bit, and M denotes a mantissa bit. For unsigned and signed integer divides (32 bits/32 bits or 64 bits/32 bits) the following alignment Formats 2 and 3, respectively, into the floating-point mantissa path 36 are required:

Format 2:  0   0   $I_{63}$ . $I_{62}$ $I_{61}$ $I_{60}$ ... $I_1$ $I_0$
           (zeros)  (integer bits (32 or up to 64) with binary point as shown)

Format 3:  S1 S0 Sign         .   $I_{62}$ $I_{61}$ $I_{60}$ ... $I_1$ $I_0$
           (sign, 2 extension bits)  (.)  (integer bits (31 or up to 63))

In accordance with a preferred embodiment, the exponent pipe 40 (FIGS. 2 and 3) implements all exponent operation for floating point divides. As illustrated in FIGS. 2 and 3, the divisor exponent and dividend exponents are stored in the exponent latch 47. The divisor exponent is subtracted from the dividend exponent by a subtracter circuit 49, and the result stored in a latch 50. This two's complement subtraction provides an exponent result (EXDIF) that is one more than the normal internal floating point value. Normally, the internal exponent must be one less than the internal floating point value in order to be correctly biased when written back (the bias is performed by inverting the MSB of the exponent value). The decrementer circuit 51 decrements the latched difference (EXDIF) by two, thereby creating an internal result exponent minus one (EXDIFM1). The actual exponent result (ACTEXP) will be one of these two exponent values or the one that lies between. All three exponents (EXDIF, EXDIFM1, and ACTEXP) or their overflow/underflow values are formed by the exception/result generator 52. The correct (final) exponent result (RESEXP) and overflow/underflow flags are selected by a multiplexor 78 based on the mantissa normalization and rounding, and latched in latch 79. In the preferred embodiment, the overflow and underflow of floating point divides are determined solely based on the result exponent (RESEXP). An exception will occur if the selected one of three exponents (RESEXP) has over or underflowed.

The exponent source latches 47 are transparent on GCLK2* and stable on GCLK2*. The subtracter 49 is precharged on GCLK2 and evaluates on GCLK2* along with the operand check latch 48. The sum latch 50 latches the difference between the exponents (EXDIF) only once during a floating point divide operation, on the falling edge of GLCK2* in the second clock cycle of the floating point divide. The latch 50 stores (holds) the EXDIF while the difference is forwarded to the decrementer 51, the exception and result generator 52 and the latch 79. On GCLK2 in the clock cycle preceding the floating point divide writeback cycle, the correct exponent (RESEXP) is selected and held stable in the latch 79 on GCLK2*. The latch 79 drives the RESEXP into the fifth stage 105 of the mantissa data path for re-alignment and output to the writeback bus 34.

Figure 7:
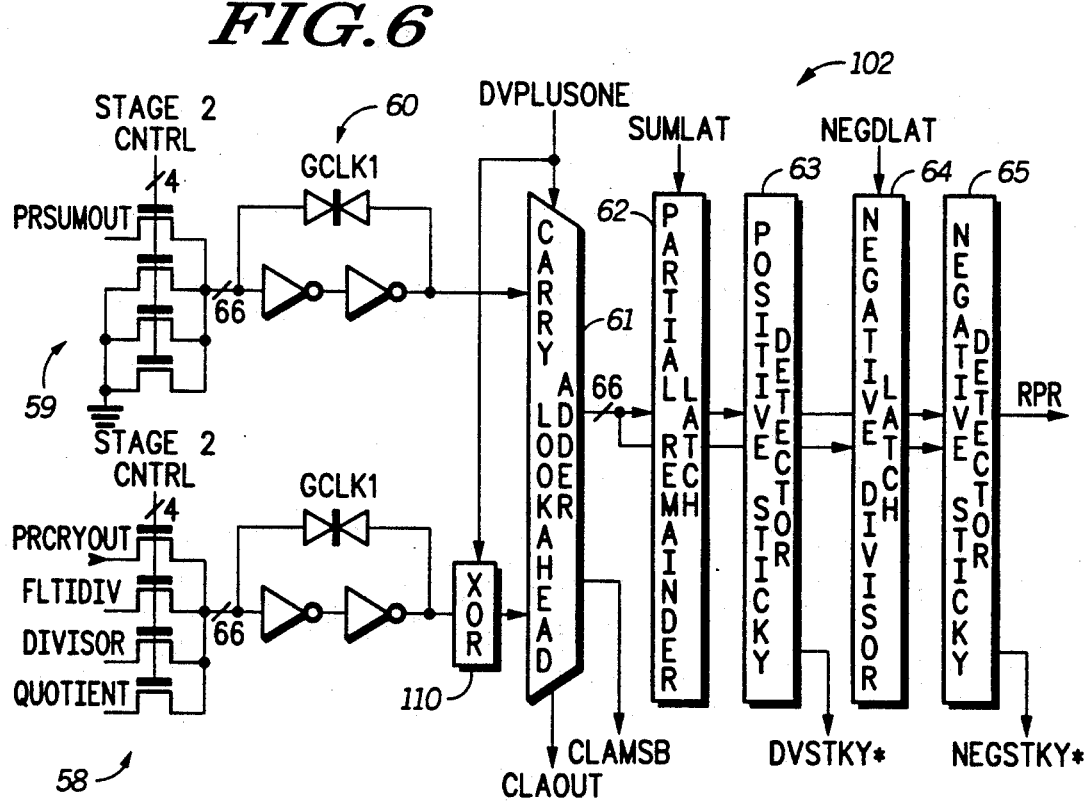
FIG. 7 illustrates, in partial schematic form, a second stage of the combination floating point and integer SRT divider of FIGS. 2 and 3, in accordance with the preferred embodiment of the present invention.

During a divide operation, the quotient select circuit 38 (FIGS. 2 and 3) examines the upper (MSB) bits of the dividend or current partial remainder to determine the next three-bit quotient digits (q0, q1, q2). Normally, the quotient select circuit 38 selects the redundant partial remainder (RDPR) formed in the first stage 101. However, in the first two floating point divide cycles (third and fourth integer divide cycles), the quotient select circuit 38 selects some version of the dividends most significant twelve bits. The first version is right-shifted by three to offset the three left-shifts performed by the partial remainder formation circuit 56. On the first pass before the "iteration loop", the partial remainder formation circuit 56 does not perform the normal function since no quotients have been selected by the quotient select circuit 38. A master/slave latch (not shown) within the quotient selection circuit 38 stores the upper bits of the dividend or partial remainder and replicates the upper eleven carry/save bits of the partial remainder latch 57. The quotient selection circuit 38 operates on the current partial remainder to form the upper bits of the next partial remainder which the first stage 101 is forming in the same clock cycle. Accordingly, the data inputs to the quotient select circuit 38 are the upper twelve bits of the dividend (including the sign bit), the fourth through fourteenth most significant eleven bits of the redundant partial remainder (RDPR), and the upper thirteen bits of the a 66-bit divisor (D). The outputs are three quotient bits (q0, q1, q2) for the first stage 101 to use during the next cycle (as illustrated in FIG. 7).

In the preferred embodiment, integer division shares the SRT floating-point circuitry, illustrated in FIG. 2, except for the exponent pipe 40 and the rounding circuitry 76 (controlled by the state machine 37). In accordance with the preferred embodiment, additional circuitry is required to perform SRT division on integers. Accordingly, divider 30 further includes integer divisor and dividend alignment circuitry 43 and 44 (FIG. 2), an adder 61 and XOR-gate 110 (FIG. 7), a priority encoder 70 and barrel shifter 72 (FIG. 3), dividend complementer circuitry 140 (FIG. 12), and some additional control and routing logic to properly sequence the integer division.

Figure 5:
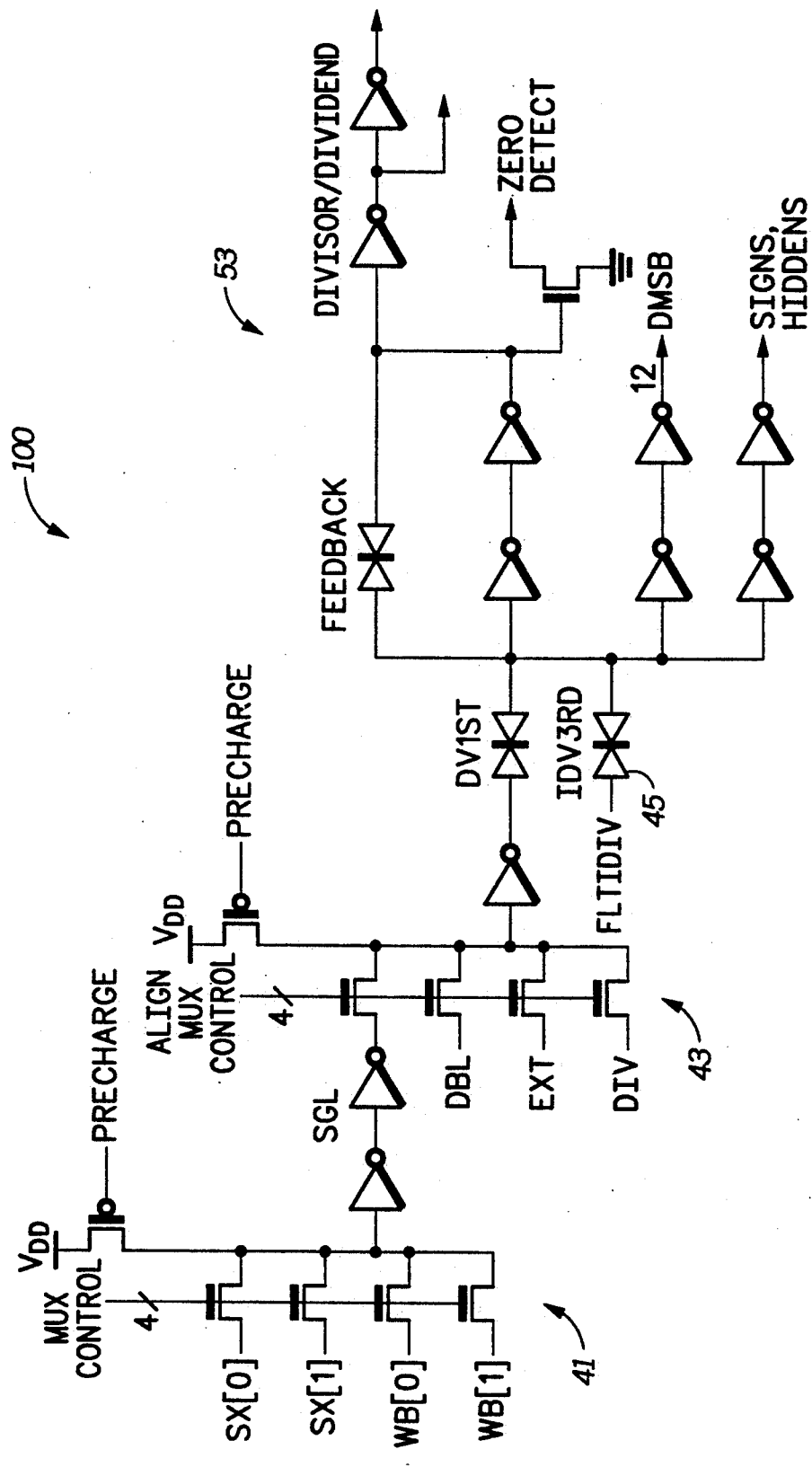
FIG. 5 illustrates, in partial schematic form, a zeroth stage of the combination floating point and integer SRT divider of FIGS. 2 and 3, in accordance with the preferred embodiment of the present invention.

In accordance with the preferred embodiment, the data flow through the divider 30 follows two main paths, one for floating point divides (FDIV) and another for integer divides (IDIV). The basic divide data flow is comprised of five stages 100-104. In the zeroth stage 100, the divisor and dividend are input, via multiplexors 41-42, aligned, via multiplexors 43-44, as illustrated in FIG. 2. In the first stage 101, the quotient select circuitry 38 uses the dividend and divisor to form the first three quotient bits (q0, q1, and q2). The three generated quotient bits (q0, q1, and q2), the dividend (DEND) and the divisor (D) are then used by the partial remainder formation circuitry 56, in the first stage 101, to form the next partial remainder, which is latched in a partial remainder latch 57, as illustrated in FIG. 5. During iterative clock cycles (the number of which is a function of the significant bits of the result), the partial remainder (PRSUM and PRCRY) is input back into the first stage 101, to thereby form the "iteration loop". The partial remainder circuitry 56 uses quotient bits produced by the quotient select circuit 38 and the divisor (D), provided via latch 53, to form the next partial remainder in a redundant carry-save form.

Figure 8:
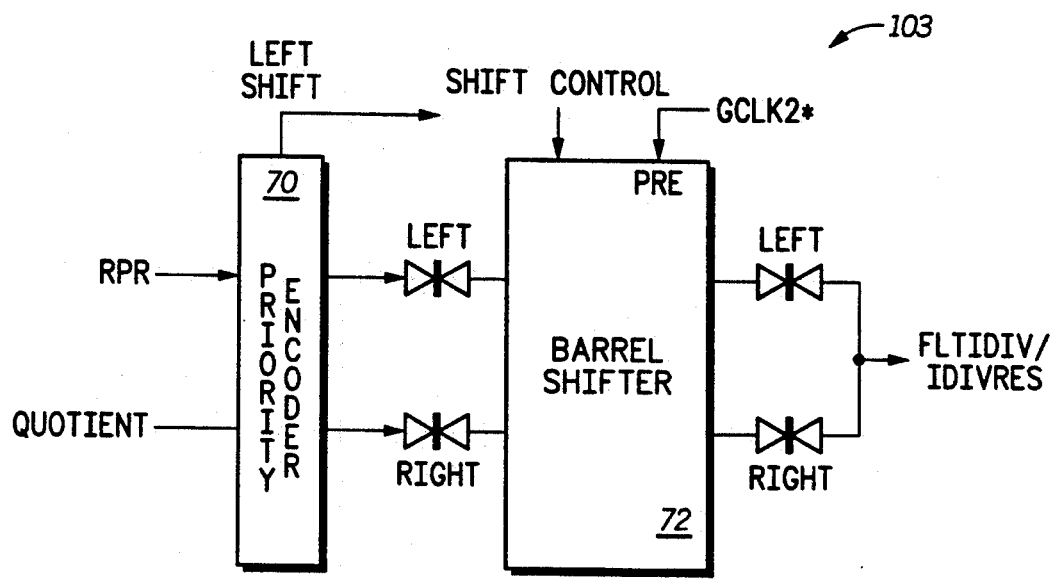
FIG. 8 illustrates, in block diagram form, a third stage of the combination floating point and integer SRT divider of FIGS. 2 and 3, in accordance with the preferred embodiment of the present invention.

In the preferred embodiment, the basic data flow is modified when integer divides are performed and when rounding is necessary during floating point divides. In the case of integer divides, an additional operation must be performed before and after the iteration loop illustrated in FIG. 6. The incoming divisor must be two's complemented in the second stage 102, as illustrated in FIG. 7. If the divisor is positive, then the divisor must be passed through the second stage 102, to the third stage 103, and then normalized in the third stage by priority encoding and left-shifting, as illustrated in FIG. 8. This procedure creates a "floated integer" divisor (FLTIDIV) which is latched back in the divisor latch 53 of the zeroth stage 100, and then the integer division proceeds. After an integer divide Q or Q−1 quotient is produced in the fourth stage 104, the selected quotient (Q or Q−1) must be right-shifted in the third stage 103 by an amount equal to thirty-one minus the divisor left-shift to form the "final integer quotient", and then two's complemented in the second stage 102 (passed through as described above if the divisor and dividend have the same sign). The final integer quotient is latched in the fourth stage 104 and driven out, through the fifth stage 105, to the writeback bus 34. The operation of divider 30 will now be described in greater detail.

The zeroth stage 100 of divider 30, illustrated in FIG. 5, forwards the divide operands from the proper source and writeback buses, 33 and 34, respectively, based upon interface (MUX CONTROL, ALIGN MUX CONTROL) signals provided by the sequencer 12. FIG. 5 illustrates the multiplexors 41, 43 and 45 for alignment of the divisor, and the latch 53; however, in the preferred embodiment, the circuitry required to align the dividend operand is identical. The multiplexor 41 selects the correct source (SX) bus, or writeback (WB) bus, for example "SX[0]", and "WB[1]", respectively, for each instruction. Multiplexor 43 align the signs, exponents, and mantissas to the floating point internal Format 1 or integer Format 2 or 3 illustrated above. The divide latch 53 latches the mantissa, checks for reserved operands, and forwards the sign(s), and hidden bits to the control logic 37.

Figure 6:
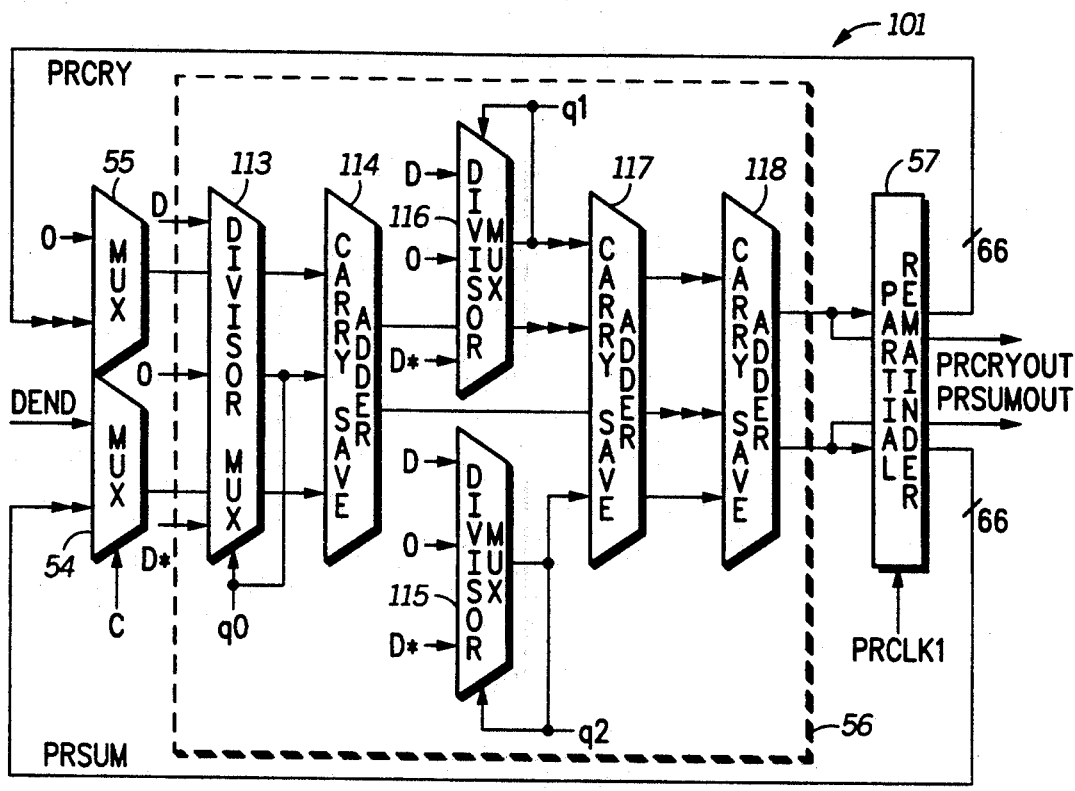
FIG. 6 illustrates, in block diagram form, a first stage of the combination floating point and integer SRT divider of FIGS. 2 and 3, in accordance with the preferred embodiment of the present invention.

In the first stage 101 of divider 30, illustrated in FIG. 6, the partial remainder formation (PRF) logic 56 forms and latches the current partial remainder each clock cycle. The PRF logic 56 operates on the dividend (DEND) or last partial remainder (PRSUM and PRCRY in redundant form) to form the next partial remainder. The formation of the next partial remainder is governed by the SRT next partial remainder equation 1.4 illustrated below. Accordingly, the formation of the next partial remainder accomplished by forming the divisor multiples of the current quotients ((q(n)D), and subtracting the divisor multiples from the last partial remainder (rPR(n−1)).

$$PR(n)=rPR(n-1)-q(n)D, \quad \text{for } n=0,1,2,\ldots,m-1 \qquad \text{Eq. (1.4)}$$

where
PR(n)=the partial remainder after the nth stage $(SX_{64}X_{63}.X_{62}\ldots)$,
rPR(−1)=the Dividend
r=radix (2 in the preferred embodiment)
q(n)=nth quotient digit (q=−1, 0, +1 for fully redundant radix 2)
D=Divisor $(S_1S_2H.X_{62}\ldots)$
m=Number of result bits required before rounding.

Accordingly, equation 1.4 requires each intermediate partial remainder (PR(n−1)) to be multiplied by "r" (which entails shifting the intermediate partial remainder by one bit position for r=2). Then the next divisor multiple (q(n)D) must be subtracted from the shifted partial remainder. The result is a signed two's complement number with a maximum magnitude of just under 4; therefore, an extra magnitude bit and sign bit must be appended to the front of the divide mantissa data path 36. In accordance with the preferred embodiment, partial remainder formation occurs in increments of three bits an iterative clock cycle. The first stage 101 of divider 30 implements Eq. 1.4 for n=N, where N is the current iterative clock cycle, therefore, the partial remainder latch 56 latches intermediate partial remainders PR(2), PR(5), PR(8), . . . PR(m−1), where "m−1" is sixty-five for a floating point divide (FDIV) extended and integer double precision operation, fifty-six for a FDIV double, twenty-six for a FDIV single precision, and thirty-two for integer divides.

In a preferred embodiment, the first stage 101 (FIG. 6) of divider 30 slightly modifies the order of subtraction of the divisor multiples (D and D*) in order to match the same configuration in the quotient select circuit 38, and the modification speeds up the worst-case path through the carry save adder (CSA) 118. The carry outputs from CSAs 114, 117, and 118 must be left shifted one or more bits than the sum outputs to keep all bits at their proper significance. Accordingly, in FIG. 6, two arrowheads denotes a left-shift by one bit position, whereas three arrowheads indicates a left-shift by two bits positions. Multiplexors 43 and 44 chooses between the dividend-DEND (for the first iteration), or the current partial remainder (PRSUM, PRCRY) in redundant carry/save form (for all other iterations).

In accordance with a preferred embodiment, the first stage 101 (FIG. 6) operates on GCLK1 cycles. In the iteration loop, the partial remainder latch is controlled by a clock signal PRCLK1, which is generated by the control logic 37, using the GCLK1 clock. An internal counter (not shown) in the control logic 37 determines when the iterative cycles are complete. Upon completion of the iteration loop, the PRCLK1 no longer controls the operation of the latch 57. Essentially, the latch 57 will hold the redundant partial remainder (RDPR) until the divider 30 completes the divide operation. Accordingly, on the rising edge of GCLK1, the three quotients (q0, q1, and q2) and the current partial remainder (PRSUM, PRCRY) change and start a new formation cycle. As illustrated in FIG. 6, the data inputs to the first stage 101 are the divisor (D) and complementary divisor (D*), the dividend (DEND) and a quotient vector (q0, q1, and q2). The divisor and dividend inputs include bits in the hidden position, 2 times Hidden, and a sign bit (for integer divides, these three bits are all signs for signed divides or two leading signs and the MSB for unsigned divides). The result is a total of sixty-six bits in the data path of the first stage 101. The outputs of the first stage 101 are the sum (PRSUMOUT) and carry (PRCRYOUT) form of the final partial remainder. The quotient vector changes every clock cycle and consists of nine bits ($-1$, 0 and $+1$ for each of the three quotients—q0, q1, and q2). The formation of the divisor "D" and 0 inputs for $q = -1$ and for $q = 0$, respectively, are trivial and the divisor mux 113 simply selects the correct multiple (D, 0) to input to CSA 104 based upon the value of q0. The formation of $-D$ for $q = +1$ is accomplished by selecting D* and adding a one in the LSB input of CSA 114 (with D*, the carry and/or sum LSB position will always be open due to the left shifts). In a similar manner, the divisor multiples are then added to the shifted intermediate partial remainder in the CSAs 117 and 118.

Figure 11:
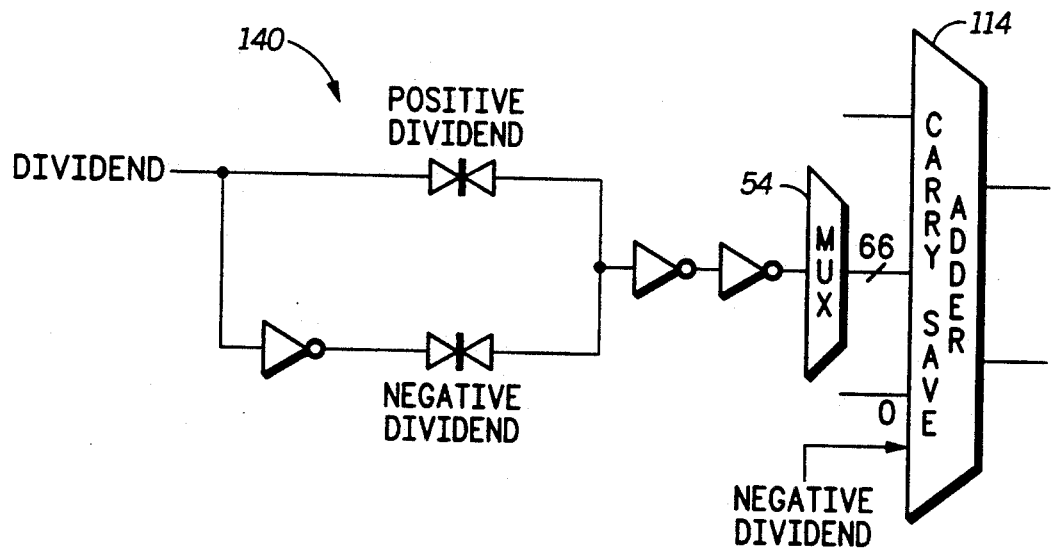
FIG. 11 illustrates, in schematic form, a dividend complementor for use in the second stage (FIG. 5) of the combination floating point and integer SRT divider of FIGS. 2 and 3, in accordance with the preferred embodiment of the present invention.

The second stage 102, illustrated in FIG. 7, functions as a general-purpose full adder. The SRT division algorithm requires that the divisor be positive. The full adder 61 used for floating-point division can be used to perform the 2's complement of any negative divisor. A two's complement mode (XOR) 110 is incorporated with the full-adder 61 such that the value input is inverted (one's complement) and added to "1", by the adder 61, in response to a control signal (DVPLUSONE). If the divisor and the dividend have opposite signs, indicating that the quotient should be negative, the complementer 110 is used to 2's complement the final integer quotient (QUOTIENT). While the adder 61 and XOR 110 operate to insure that the divisor is always positive, a dividend complementor 140 (FIG. 11) provides a fast method of making the dividend a positive value. By running the dividend through an inverter, during integer divides, the interim quotient is always positive, therefore, eliminating the requirement for additional circuitry to properly apply ceiling and floor functions. The positive quotient result can always be properly rounded toward zero simply by truncating the bits to the right of the least significant bit.

In the second stage 102, during a divide operation, the partial remainder sum (PRSUMOUT) and carry (PRCRYOUT) results from the first stage 101 (FIG. 6) are added at the end of the divide iterations to form the irredundant partial remainder. The second stage circuitry 102 is also used for two's complementing negative integer divisors and integer quotients (if required), and for incrementing a floating point quotient when rounding is necessary. All sums are latched in the partial remainder latch 62. The second stage circuitry 102 also performs the sticky detection on the irredundant partial remainder. Sticky detection on a negative partial remainder requires a bit-wise XOR with the negative divisor, formed during the first iterative cycle and stored in the negative divisor latch 64, before the wired OR (not shown), as described in "In a Data Processor An SRT Divider Having a Negative Divisor Sticky Detection Circuit", Ser. No. 07/891,094, U.S. Pat. No. 5,237,525, by Paul C. Rossbach, filed herewith and assigned to the assignee hereof. This is required since a negative partial remainder exactly equal to the $-D$ multiple indicates an exact result.

In the preferred embodiment, the carry look-ahead adder 61 (FIG. 7) is precharged on GCLK1* and evaluates on GCLK1. Consequently, the carry look-ahead adder latch 60 is stable, and the partial remainder latch 62 and negative divisor latch 64 are transparent on GCLK1. On GCLK1*, the partial remainder latch 62 and negative divisor latch 64 are stable, and the positive and negative sticky detection logic, 63 and 65, respectively, perform their evaluation. The data inputs to the second stage 102 (FIG. 7) are the partial remainder sum and carry results from the first stage 101, PRSUMOUT and PRCRYOUT, respectively; the DIVISOR (two's complemented divisor or negative integer divide), and the QUOTIENT (when rounding a floating point result or two's complementing a signed integer result). The outputs of the second stage 102 are the real partial remainder for the final quotient or a two's complemented integer divisor (RPR), the positive partial remainder sticky bit (DVSTKY*), the negative partial remainder sticky bit (NEGSTKY*), the carry look-ahead adder most significant bit (CLAMSB) to determine the sign of the partial remainder, and the carry look-ahead adder carry-out bit (CLACOUT) to identify any overflow occurring on rounding or two's complementing the quotient.

In accordance with the present invention, the third stage 103, illustrated in FIG. 8, operates on integer divisors and quotients for integer divides. The positive divisor must be left-shifted to place the left-most "1" bit in the floating-point "H" position, as illustrated in Format 1. This pseudo-normalization of the divisor enables use of the SRT algorithm. Accordingly, the priority encoder 70 identifies the amount of left-shift necessary, and in so doing provides a LEFT-SHIFT control signal to the barrel shifter 72, to thereby allow the barrel shifter 72 to perform an arithmetic left-shift on the positive integer divisor. Accordingly, the quotient is shifted right an amount equal to 31 minus the original left-shift amount in order to properly align the quotient result. If the divisor and dividend have opposite signs, then the quotient must be two's complemented to change its sign, again in the second stage 102 (FIG. 7), after being sent to the third stage 103.

In the preferred embodiment, the static priority encoder 70 evaluates on GCLK1* and T1. The bi-directional shifter 72 is precharged on GCLK2* and evaluates on GCLK2. The inputs to the third stage 103 are the output of the partial remainder latch 62, which holds the positive integer divisor, the quotient, and the amount to right-shift the quotient. The outputs are the floated integer divisor (FLTIDIV) or the integer quotient result (IDIVIRES), which are transferred onto the FLTIDIV/IDIVRES bus 77, and the amount the divisor was left-shifted.

Figure 9:
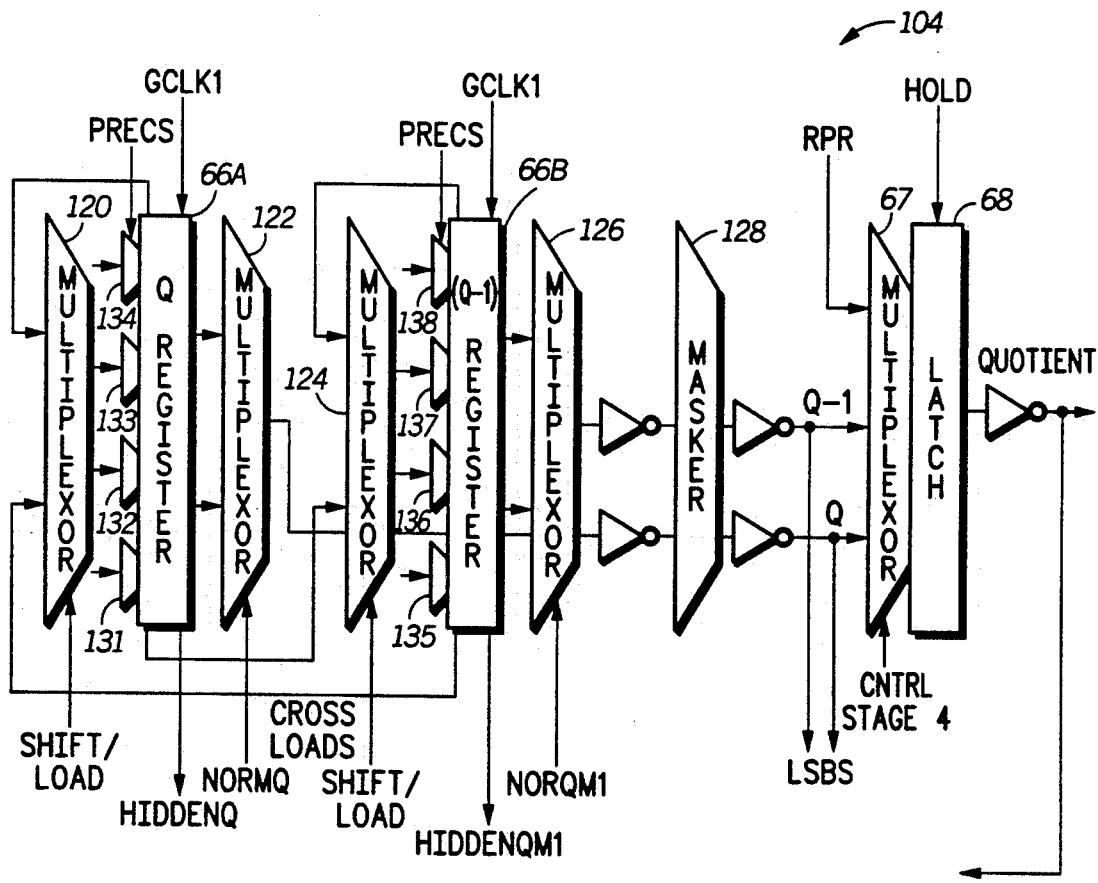
FIG. 9 illustrates, in block diagram form, a fourth stage of the combination floating point and integer SRT divider of FIGS. 2 and 3, in accordance with the preferred embodiment of the present invention.
Figure 12:
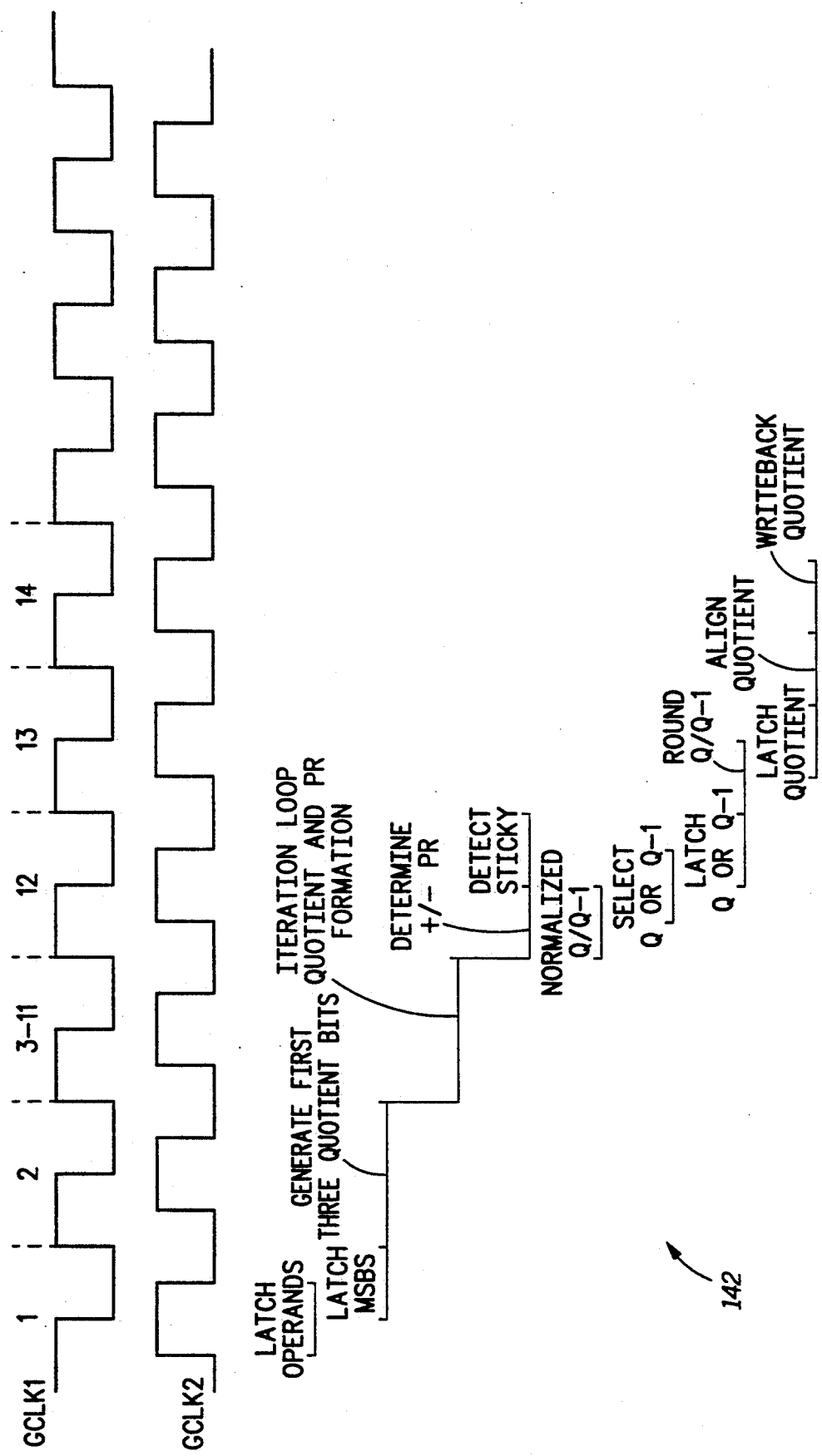
FIG. 12 illustrates, in timing diagram form, a sequence of operations performed by the combination floating-point and integer SRT divider during a floating point divide operation, in accordance with the preferred embodiment of the present invention.
Figure 13:
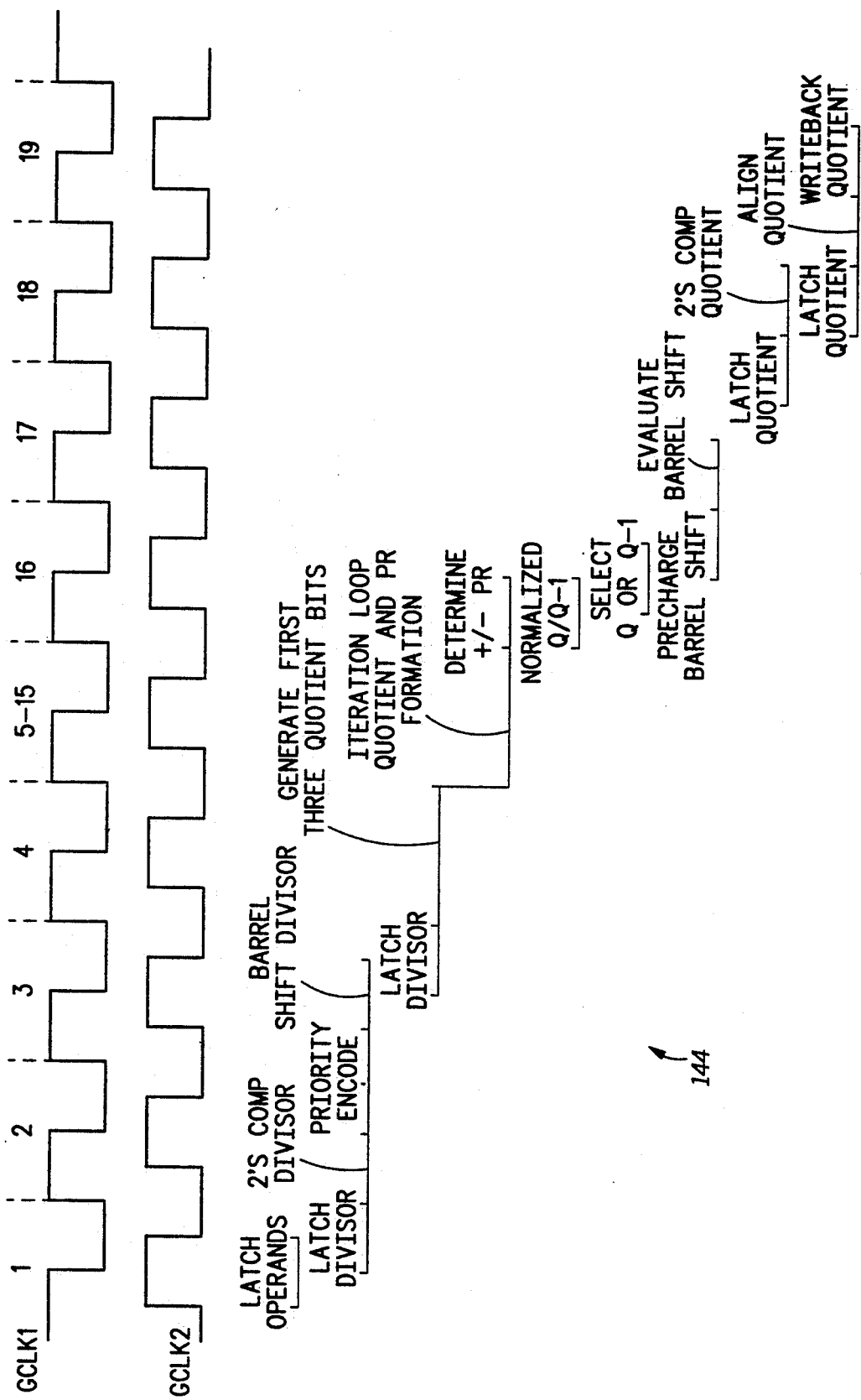
FIG. 13 illustrates, in timing diagram form, a sequence of operations performed by the combination floating-point and integer SRT divider during an integer divide operation, in accordance with the preferred embodiment of the present invention.

In the fourth stage 104, illustrated in FIG. 9, the quotient registers Q and Q−1 registers, 66A and 66B, respectively, build the quotients for a positive and negative final partial remainder, respectively. As previously indicated, the quotients are built three bits at a time based on the radix-2 quotients (q0, q1, q2). The radix-8 three bit quotient is formed and inserted into the Q and Q−1 registers, 66A and 66B, respectively, in a bit position that corresponds to the result precision (single—S, double—D, extended—X, or integer—I). Accordingly, the multiplexors 120 and 124, only load three bits into distinct locations in the Q and Q−1 registers, 66A and 66B, depending upon the precision (PRECS) of the divide operation. These three bits are generated by a subtracter circuit (not shown) in the control logic 37 (FIGS. 2 and 3). In the fourth stage 104, both quotients Q and Q−1 are formed in order to avoid having to decrement the quotient when the partial remainder is negative. The Q and Q−1 quotients are formed on the same GLCK1 cycle that the partial remainder is formed in stage one 101, that is, the clock cycle after the quotient select circuit 38 choose the three radix-2 quotients, as illustrated in FIGS. 12 and 13. Illustrated in TABLE I below are the proper formation for all radix-8 Q and Q−1 (denoted as "QM1") quotients.

TABLE I

| q[k + 1] | | Q[k + 1] | QM1[k + 1] | |
|---|---|---|---|---|
| −7 | | (QM1[k],0,0,1) | (QM1[k],0,0,0) | |
| −6 | | (QM1[k],0,1,0) | (QM1[k],0,0,1) | |
| −5 | | (QM1[k],0,1,1) | (QM1[k],0,1,0) | |
| −4 | CROSSLOAD | (QM1[k],1,0,0) | (QM1[k],0,1,1) | SHIFT |
| −3 | | (QM1[k],1,0,1) | (QM1[k],1,0,0) | |
| −2 | | (QM1[k],1,1,0) | (QM1[k],1,0,1) | |
| −1 | | (QM1[k],1,1,1) | (QM1[k],1,1,0) | |
| 0 | | (Q[k],0,0,0) | (QM1[k],1,1,1) | |
| 1 | | (Q[k],0,0,1) | (Q[k],0,0,0) | |
| 2 | | (Q[k],0,1,0) | (Q[k],0,0,1) | |
| 3 | | (Q[k],0,1,1) | (Q[k],0,1,0) | |
| 4 | SHIFT | (Q[k],1,0,0) | (Q[k],0,1,1) | CROSSLOAD |
| 5 | | (Q[k],010,1) | (Q[k],1,0,0) | |
| 6 | | (Q[k],1,1,0) | (Q[k],1,0,1) | |
| 7 | | (Q[k],1,1,1) | (Q[k],1,1,0) | |

The Q and Q−1 ("QM1") quotient values are formed by "shifting", in response to a SHIFT control signal, the register 66A and 66B, respectively, by three bit positions and appending the next three-bit quotient in the point determined by the result precision. Alternatively, the Q and Q−1 quotient values are formed by "cross loading", in response to a CROSS-LOADING signal, the value stored in one register (i.e. 66B), into the other (i.e. 66A), as illustrated in FIG. 9. In a conventional manner, the next three low ordered bits of Q and Q−1 are obtained from subtracters (not shown) in the control logic 37, which form a three-bit binary number (Q0, Q1, Q2) and three-bit binary number minus one (QM0, QM1, QM2) from the three radix-2 quotient bits (q0, q1, q2). Accordingly, the control logic 37 provides the control information to determined whether to SHIFT LEFT the value stored in the registers 66A and 66B or to CROSS LOAD the value stored in register 66B into 66A.

In the preferred embodiment, once the Q and Q−1 quotients are formed, the results are sent to the latch 68 by way of normalizing multiplexors 122 and 126, respectively, and a guard/round bit masker 128. Each result Q and Q−1, is independently normalized based the value of the hidden (H) bit stored in the respective register 66A and 66B. If the H-bit is a "0", the output is left-shifted; if the H-bit is a "1", the result is output as is. Thus, a one bit position normalization is all that is required. For floating point divide results sizes smaller than extended precision, all bits to the right of the least significant bit are set to "1" as the Q and Q−1 quotients are being constructed. This allows easier implementation of the rounding since the adders "carry-in" can be used for all precisions. The masker circuit 122 is required, however, to set the guard (G), round (R), and up to two sticky (S) bits (collectively referred to as the "GRS" bits) that are formed in the registers 66A and 66B. The GRS bits are stored in the control logic 37 to insure that they are not lost as a result of the masking operation. The GRS bits are input into registers 66A and 66B only to simplify the quotient building logic. The control signals routed to latch 68 select the register 66A or 66B based on the partial remainder's sign. When the floating point divide result was rounded, the latch 68 will select the real partial remainder (RPR) from latch 62 (FIG. 6) on cycles following the initial selection of Q or Q−1.

In the preferred embodiment, during a divide operation, the fourth stage 104 of divider 30, illustrated in FIG. 9 operates on the GCLK1 cycle similar to the first stage 101 and the quotient select logic 38. Registers 66A and 66B are master/slave shift-by-three registers with parallel loading from 2×1 multiplexors 120 and 124, respectively. The master latches (not shown) are transparent during GCLK1* and the slave latches (not shown) during GCLK1. The registers 66A and 66B continue to shift/load quotient bits until the iteration loop terminates under the control of control logic 37. At that time, the output of the quotient register (GCLK* stable) are normalized based on the value of their hidden bits. During GCLK2, Q or Q−1 are selected by the latch 68 based on the sign of the result of the partial remainder addition that took place in the second stage 102. Also during subsequent cycles of GCLK2, multiplexor 68 selects the RPR (for a floating point divide that required rounding) or IDIVRES result (for an integer quotient after said has been shifted). In response to a HOLD signal, the latch 68 stores the RPR or IDIVRES for forwarding to the fifth stage 105.

Accordingly, as illustrated in FIG. 8, the fourth stage 104 of the divider 30 contains the Quotient (Q) Register 66A, and the Quotient Minus One (Q−1) Register 66B, and the quotient multiplexor 67 and latch 68. Accordingly, the inputs to the fourth stage 104 are the control (CNTRL, SHIFT/LOAD) and quotient (SUB) bits, which are generated by the control logic 37 to properly build the Q and Q−1 quotients in register 66A and 66B, respectively. In the preferred embodiment, these inputs must travel up to the full length of the data path from the control logic 37 in order to be input at the correct significance (bit position) in the result. Additional inputs to the fourth stage 104 are the redundant partial remainder (RPR) from latch 62 which share the latch 68 pending their transfer onto to the writeback bus 66. The primary output of the fourth stage 104 is the quotient result (QUOTIENT). Other outputs are the hidden (HIDDEN Q, and HIDDEN Q−1) and least significant bits (LSB) to the control logic 37 for both Q and Q−1.

Figure 10:
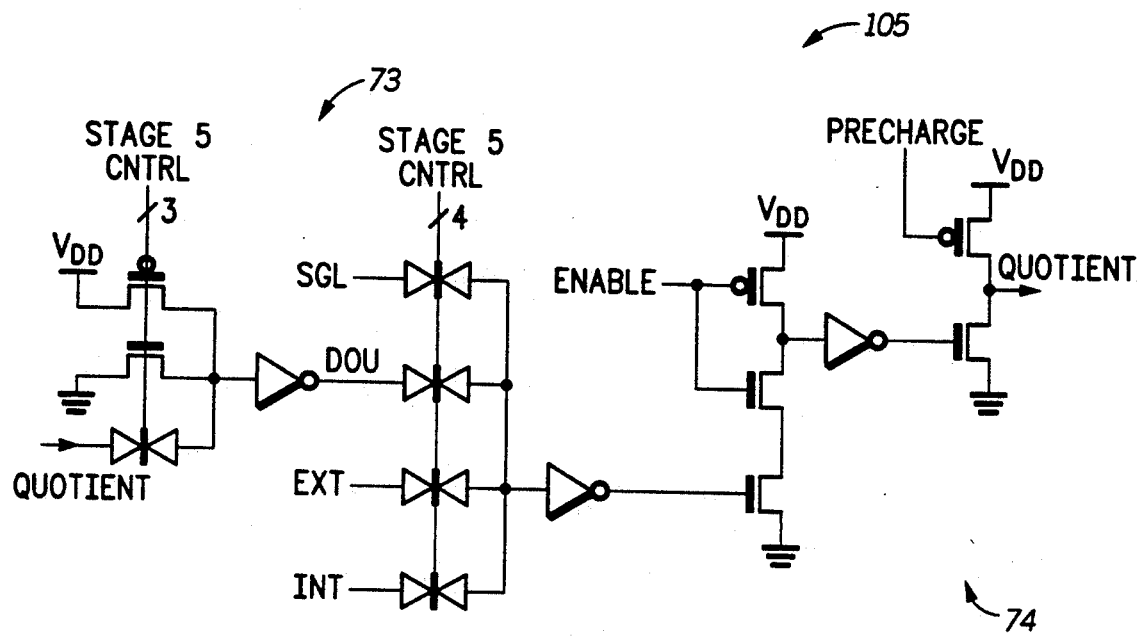
FIG. 10 illustrates, in schematic form, a fifth stage of the combination floating point and integer SRT divider of FIGS. 2 and 3, in accordance with the preferred embodiment of the present invention.

In accordance with the present invention, the fifth stage 105 (FIG. 10) of divider 30 handles the exception mantissa results, realigns the quotient result (QUOTIENT) back to the register file format of data processing system 10, and ensures that the writeback bus 34 is driven during GCLK2. Accordingly, the quotient (QUOTIENT) is stable during GCLK2* and is passed through the exception multiplexor 69, unaligned, and fed into the write-back multiplexor latch during the same phase. The unaligned quotient is latched and stable on GLCK2 for a writeback enable (not shown) which will arrive at THE GCLK2 phase when the sequencer 12 provides a divider writeback bus grant signal. The input to the fifth stage 105 is the quotient (QUOTIENT) in the internal floating point unit format, and the output is the realigned quotient or the proper exception/SLZ value on the writeback bus 34.

As described in TABLE II below, the data flow through divider 30 follows two main paths; one for the floating point divides, and another for the integer divides.

tient value (Q) for a positive final partial reminder is accumulated in the Q register 66A (FIG. 9), while the quotient value (Q−1) for a negative final partial remainder is accumulated in the Q−1 register 66B (FIG. 9). As previously described, the quotient values Q and Q−1 are normalized, selected and latched in latch 68. During the thirteenth clock cycle, the selected quotient value Q or Q−1 is rounded under the control of the rounding circuitry 76. The multiplexor 73 then aligns and routes the selected quotient Q or Q−1 to the writeback drivers 74. The divider 30 transfers the realigned quotient value onto the writeback bus 34.

In accordance with the present invention, the sequence of operation of divider 30 is slightly modified during the performance of an integer divide operation. As illustrated in FIG. 13, additional operations must be performed before and after the iteration loop. The additional operations insure that the integer divisor and dividend values are properly aligned into a format suitable for use by the divider mantissa data path portion 36 (FIGS. 2 and 3) of the divider 30. Accordingly, the divider 30 performs a sequence of operations to re-configure the integer divisor and dividend values into a data path representation which the SRT algorithm requires for floating-point mantissas.

As illustrated by timing diagram 144, during the first

TABLE II

| Clock(s) | FLOATING POINT | Clock(s) | INTEGER |
|---|---|---|---|
| 1 | Latch operands/MSBs Perform operand check | 1 | Latch operands Latch Divisor |
| 2 | Select 1st set quotient (q) bits | 2 | 2's comp. Divisor |
| 3-11 | Enter Iteration Loop Quotient and PR Formation | 3 | Decode, Barrel Shift and Latch Divisor |
| 12 | Determine (+/−) PR and Sticky bit Normalize Q/Q-1, Select Q or Q-1 | 4 | Select 1st set quotient bits |
| 13 | Round Quotient, Detect Overflow Re-align Quotient, Latch Quotient | 5-15 | Enter Iteration Loop Quotient & PR Formation |
| 14. | Write-back Quotient | 16 | Determine (+/−) PR Normalize Q/Q-1 Select Q or Q-1 |
| | | 17 | 2's comp./Latch Quotient |
| | | 18 | Re-align, Latch Quotient |
| | | 19. | Write-back Quotient |

FIG. 12 is a timing diagram 142 illustrating the sequence of operations performed by divider 30 for the floating point divide. Similarly, FIG. 13 is a timing diagram 144 illustrating the sequence of operations performed by divider 30 for the integer divide.

As illustrated by timing diagram 142, during a first clock interval, the dividend and divisor (i.e. S1 and S2) are latched by latches 46 and 53, respectively. The divisor will remain stored in latch 53 for the entire duration of the divide operation. The quotient select circuit 38 (FIGS. 2 and 3) examines the upper (MSB) bits of the dividend, during the first cycle, and generates the first three quotient digits (q0, q1, q2) during the second cycle. As illustrated in FIG. 12, the divider 30 enters an iteration loop in the third cycle. During iterative clock cycles three through eleven, the quotient bits are accumulated by the quotient select circuit 38, while the partial remainder formation logic 56 uses the quotient bits and the divisor stored in latch 53 to form the intermediate partial remainders in a redundant carry-save form.

During the twelfth clock cycle, the divider 30 determines the positive or negative (+/−) real (final) partial remainder. The positive and negative sticky detectors, 63 and 65, respectively, illustrated in FIG. 7 determine the exactness of the quotient. Simultaneously, the quoclock cycle, the integer dividend and divisor values (i.e. S1 and S2) are latched by latches 46 and 53, respectively. The incoming integer divisor is latched in the carry look-ahead latch 60 (FIG. 7) during the first clock cycle. The SRT algorithm requires at a minimum that the divisor be normalized. Consequently, during the second and third clock cycles, an incoming negative divisor must be two's complemented in the second stage 102 (FIG. 7), and then normalized in third stage 103 (FIG. 8) by priority encoding and left-shifting. This sequence of operations creates the floated integer divisor (FLTIDIV) previously described. During the third cycle, the floated integer divisor is latched back into latch 53. The integer divide operation then proceeds as described above for the floating point divide operation. Accordingly, the first three quotient bits are generated during the fourth clock cycle, and the divider 30 enters the iteration loop in the fifth clock cycle.

An integer divide (Q or Q−1) quotient is produced in the fourth stage 104 (FIG. 9). As previously indicated, additional operations must be performed after the iteration loop. Thus, during the seventeenth clock cycle, the selected quotient (Q or Q−1) must be right-shifted in the third stage 103 (FIG. 8) by an amount equal to thirty-one minus the divisor left shift, and two's cmplemented in the second stage 102 (passed through if the divisor and dividend have the same sign). This sequence of operations produces the integer divide quotient. During the eighteenth clock cycle, the integer divide quotient is latched in latch 68. The integer divide quotient is then realigned into the proper internal data format by multiplexor 73. After realignment, the integer divide quotient is routed to the writeback drivers 74 (FIG. 3) and transferred onto the writeback bus 34, during the nineteenth clock cycle.

Thus, in the present invention, SRT division on integers is accomplished by first aligning the integer operand values, via alignment multiplexors 43 and 44, into the required format, Format 2 (unsigned integer) or Format 3 (signed interger). The SRT algorithm requires that the divisor be a positive value, therefore, negative incoming divisors are two's-complemented by the CLA adder 61. The priority encoder 70 and barrel shifter 72 operate to "pseudo-normalize" the divisor to place the left-most "1" bit into the floating-point "H" position. Accordingly, the priority encoder 70 determines the required amount the divisor must be left-shifted, and the barrel shifter 72 performs the arithmetic left-shift on the divisor. The barrel shifter 72 also performs an arithmetic right-shift on the positive integer quotient by an amount equal to thirty-one minus the original left-shift amount to ensure that the quotient result is the proper magnitude.

Although the present invention has been described in accordance with a preferred embodiment, it should be apparent to one of ordinary skill in the art that the invention may be practiced in numerous ways. For example, the present invention may be used for combined integer and floating-point division in any SRT divider regardless of radix. Accordingly, it is intended by the appended claims to cover all modifications of the invention which fall within the true spirit and scope of the invention.

I claim:

1. In a data processor having an iterative divider unit for executing a plurality of divide instructions issued by a sequencer, and a storage unit for storing a plurality of data operands, a method for performing integer and floating point SRT division in said divider unit comprising the steps of:

aligning, via an alignment circuit, a first data operand and a second data operand, retrieved from said storage unit, into a predetermined data format based upon a type of divide operation to be performed by said divider unit;

forming, via a complementing adder circuit, a two's complement of said first data operand, when said type of divide operation is an integer divide, and normalizing, via said complementing adder circuit, said two's complement of said first data operand to create a floated integer divisor;

generating via a quotient select circuit a first set of quotient bits using said first data operand and said second data operand and iteratively accumulating one of a plurality of successive sets of quotient bits each clock cycle, to thereby form a predetermined number of quotient values, while simultaneously using said successive sets of quotient bits and said floated integer divisor to form, via a partial remainder formation circuit, a plurality of intermediate redundant partial remainders; and normalizing, via a priority encoder circuit and a barrel shifter each of said predetermined number of quotient values, into said predetermined data format, to form a predetermined number of normalized quotient values and selecting one of said predetermined number of normalized quotient values to be a quotient result, said barrel shifter subsequently shifting said quotient result by a predetermined number of bit positions to ensure said quotient result by a proper magnitude representation.

2. The method of claim 1 further comprising the steps of:

forming, via said complementing adder circuit, a two's complement of said quotient result, when said first data operand and said second data operand have opposite signs and said type of divide operation is said integer divide, to form an integer device quotient; and transferring said integer divide quotient into said storage unit.

3. The method of claim 1 further comprising the step of complementing, via a complementer circuit, said second data operand when said second data operand is a negative value and said type of divide operation is said integer divide, to ensure a positive interim quotient result, said positive interim quotient result eliminating a requirement to implement ceiling and floor functions during said integer divide.

4. The method of claim 1 wherein said step of normalizing said two's complement of said first data operand to create a floated integer divisor comprises the steps of:

evaluating, via said priority encoder circuit, an amount of left-shift required to place a left-most "1" bit of said first data operand into a floating-point position determined by a floating point data format and providing a shift control signal representative of said amount of left-shift required; and shifting, via said barrel shifter, said first data operand by a number of bit positions corresponding in magnitude to the required amount of left-shift to create said floated integer divisor.

5. In a data processor having an inerative divider unit for executing a plurality of divide instructions issued by a sequencer, and a storage unit for storing a plurality of data operands, a method for performing integer and floating point SRT division using said divider unit comprising the steps of:

aligning, a first data operand and a second data operand, retrieved from said storage unit, into a predetermined data format based upon a type of divide operation to be performed by said divider unit;

forming, via a complementing adder circuit, a two's complement of said first data operand, when said type of divide operation is an integer divide, and normalizing said two's complement of said first data operand, using said complementing adder circuit, to create a floated integer divisor;

generating, via a quotient select circuit, a first set of quotient bits using said first data operand and said second data operand and iteratively accumulating one of a plurality of successive sets of quotient bits each clock cycle, to thereby form a predetermined number of quotient values, while simultaneously using said successive sets of quotient bits and said first data operand to form, via a partial remainder formation circuit, a plurality of intermediate redundant partial remainders;

normalizing, via a priority encoder circuit and a barrel shifter, each of said predetermined number of quotient values into said predetermined data format, to form a predetermined number of normalized quotient values and selecting one of said predetermined number of normalized quotient values to be a quotient result;

shifting, via said barrel shifter, said quotient result by a predetermined number of bit positions to provide a proper magnitude representation of said quotient result; and forming a two's complement of said quotient result, using said complementing adder circuit, when said type of divide operation is said integer divide, to form an integer divide quotient.

6. The method of claim 5 further comprising the step of transferring said re-aligned integer divide quotient back to said storage unit after said divide operation has been performed by said divider unit.

7. The method of claim 5 further comprising the step of complementing, via said complementing adder circuit, said second data operand when said second data operand is a negative value and said type of divide operation is said integer divide, to ensure a positive interim quotient result, said positive interim quotient result eliminating a requirement to implement ceiling and floor functions during said integer divide.

8. The method of claim 5 wherein said step of normalizing said two's complement of said first data operand to create a floated integer divisor comprises the steps of:

evaluating, via said priority encoder circuit, an amount of left-shift required to place a left-most "1" bit of said first data operand into a floating-point position determined by a floating point data format and providing a shift control signal representative of said amount of left-shift required; and shifting, via said barrel shifter, said first data operand by a number of bit positions corresponding in magnitude to the required amount of left-shift to create said floated integer divisor.

9. In a data processor having an iterative divider unit for executing a plurality of divide instructions issued by a sequencer, and a storage unit for storing a plurality of data operands, a method for performing integer and floating point SRT division using said divider unit comprising the steps of:

retrieving a first data operand and a second data operand from said storage unit;

aligning, via an alignment circuit, said first data operand and said second data operand into a predetermined data format based upon a type of divide operation to be performed by said divider unit;

forming, via a complementing adder circuit, a two's complement of said first data operand, when said type of divide operation is an integer divide, and normalizing, via said complementing adder circuit, said two's complement of said first data operand to create a floated integer divisor;

examining, via a quotient select circuit, a predetermined number of most significant bits of said second data operand, and using said predetermined number of most significant bits to generate a first set of quotient bits;

complementing said second data operand, when said type of divide operation is said integer divide, to ensure a positive interim quotient result, said positive interim quotient result eliminating a requirement to implement ceiling and floor functions during said integer divide;

accumulating, via said quotient select circuit, a plurality of successive sets of quotient bits by iteratively generating a predetermined number of quotient bits each clock cycle to thereby form a predetermined number of quotient values, while simultaneously using said successive sets of quotient bits and said first data operand to form, via a partial remainder formation circuit, a plurality of intermediate redundant partial remainders;

normalizing, via a priority encoder circuit and a barrel shifter, each of said predetermined number of quotient values into said predetermined data format to form a predetermined number of normalized quotient values, and selecting one of said predetermined number of normalized quotient values to be a quotient result;

shifting, via said barrel shifter, said quotient result by a predetermined number of bit positions to provide a proper magnitude representation of said quotient result; and forming a two's complement of said quotient result, using said complementary adder circuit, when said type of divide operation is said integer divide, to create an integer divide quotient.

10. The method of claim 9 further comprising the steps of:

realigning said integer divide quotient into an internal format of said data processor for storage in said storage unit; and transferring said re-aligned integer divide quotient back to said storage unit.

11. The method of claim 9 wherein said step of normalizing said two's complement of said first data operand to create a floated integer divisor comprises the step of evaluating, via said priority encoder circuit, an amount of left-shift required to place a left-most "1" bit of said first data operand into a floating-point position determined by a floating point data format and providing a shift control signal representative of said amount of left-shift required.

12. In data processor, an iterative divider unit for executing a plurality of divide instructions issued by a sequencer, said divider unit receiving, under the control of said sequencer, a plurality of data operands from a storage unit and performing divide operations using said plurality of data operands, said divider unit having a controller for providing a plurality of control signals to control the sequence of operations performed by said divider unit, said divider unit comprising:

a first alignment circuit for receiving a first data operand and a second data operand from said storage unit and for aligning said first data operand and said second data operand into a predetermined data format based upon a type of divide operation to be performed by said divider;

a complementing adder and normalizer circuit coupled to said first alignment circuit for receiving said first data operand and for forming a two's complement of said first data operand, when said type of divide operation is an integer divide, said complementing adder and normalizer circuit normalizing said two's complement of said first data operand to create a floated integer divisor, and subsequently forming a two's complement of a quotient result when said type of divide operation is said integer divide to form an integer divide quotient; and an iterative divider circuit coupled to said first alignment circuit and said complementing adder circuit for receiving said first data operand and said second data operand and iteratively generating there-from one of a plurality of successive sets of quotient bits per clock cycle, said iterative divider circuit accumulating each set of quotient bits generated per clock cycle to form a predetermined number of quotient values, while simultaneously using said successive sets of quotient bits and said floated integer divisor to form a plurality of intermediate redundant partial remainders, said iterative divider circuit normalizing each of said predetermined number of quotient values into said predetermined data format, to form a predetermined number of normalized quotient values and selecting one of said predetermined number of normalized quotient values to be a quotient result.

13. The divider unit of claim 12 further comprising a second alignment circuit coupled to said iterative divider circuit, said second alignment circuit re-aligning said integer divide quotient into an internal data format of said data processor and transferring said re-aligned integer divide quotient back to said storage unit.

14. The divider unit of claim 12 wherein said first alignment circuit comprises:
   a predetermined number of multiplexors for aligning said first data operand and said second data operand into said predetermined data format in response to a first set of control signals received from said controller; and
   a first set of registers coupled to said predetermined number of multiplexors for storing said floated integer divisor and said second data operand.

15. The divider unit of claim 12 wherein said complementing adder and normalizer circuit comprises:
   an adder circuit for computing said two's complement of said first data operand, and subsequently computing said two's complement of said quotient result;
   a priority encoder and barrel shifter circuit for normalizing said two's complement of said first data operand to create the floated integer divisor, and for subsequently shifting said quotient result by a predetermined number of bit positions to properly align said quotient result; and
   a register for storing said intermediate redundant partial remainders formed by said iterative divider circuit.

16. The divider unit of claim 12 wherein said iterative divider circuit comprises:
   quotient select circuitry coupled to said register and a selected one of said predetermined number of multiplexors for using said first data operand and said second operand to generate said first set of quotient bits and for iteratively generating said set of successive quotient bits per clock cycle;
   partial remainder formation logic coupled to said quotient select circuitry for using each set of quotient bits and said floated integer divisor to generate, per clock cycle, each of said plurality of intermediate redundant partial remainders, said intermediate redundant partial remainders being used by said adder means to generate a final remainder;
   a second set of registers coupled to said partial remainder formation logic and said quotient select circuitry for storing one of said successive sets of quotient bits accumulated per clock cycle to form therein said predetermined number of quotient values, and for storing said predetermined number of normalized quotient values; and
   a second set of multiplexors coupled to said second set of registers for normalizing each of said predetermined number of quotient values into said predetermined data format to form said predetermined number of normalized quotient values, and for selecting one of said predetermined number of normalized quotient values to be a quotient result.

* * * * *

UNITED STATES PATENT AND TRADEMARK OFFICE
CERTIFICATE OF CORRECTION

PATENT NO. : 5,272,660

DATED : December 21, 1993

INVENTOR(S) : Paul C. Rossbach

It is certified that error appears in the above-identified patent and that said Letters Patent is hereby corrected as shown below:

Column 16, line 40, change "inerative" to --iterative--

Signed and Sealed this

Nineteenth Day of July, 1994

*Attest:*

BRUCE LEHMAN

*Attesting Officer*     *Commissioner of Patents and Trademarks*